United States Patent [19]

Candida et al.

[11] Patent Number: 4,897,274

[45] Date of Patent: Jan. 30, 1990

[54] MULTI-LAYER HIGHLY MOISTURE AND GAS PERMEABLE PACKAGING FILM

[75] Inventors: Giovanni Candida, Via D'Annunzio; Luigi Perazzo, Cuneo, both of Italy

[73] Assignee: W. R. Grace & Co., Duncan, S.C.

[21] Appl. No.: 72,497

[22] Filed: Jul. 13, 1987

[30] Foreign Application Priority Data

Oct. 29, 1986 [EP] European Pat. Off. ........ 86115018.3

[51] Int. Cl.⁴ ...................... B32B 27/28; B65D 75/00
[52] U.S. Cl. .................................... 426/127; 426/130; 426/415; 428/34.8; 428/516; 428/517; 428/518
[58] Field of Search .................. 426/127, 415, 8, 130; 428/517, 518, 516, 35, 34.8

[56] References Cited

U.S. PATENT DOCUMENTS

| | | | |
|---|---|---|---|
| 2,266,700 | 12/1941 | Abrams et al. | 426/8 |
| 2,961,322 | 11/1960 | Winterberg et al. | 426/8 |
| 3,205,077 | 9/1965 | Hammond | 426/127 |
| 3,663,240 | 5/1972 | Seiferth et al. | 426/127 |
| 4,058,647 | 11/1977 | Inoue et al. | 426/127 |
| 4,276,340 | 6/1981 | Leiris | 426/8 |
| 4,292,355 | 9/1981 | Bonis | 264/171 |
| 4,440,824 | 8/1984 | Bonis | 264/171 |
| 4,699,846 | 10/1987 | Ohya et al. | 426/127 |
| 4,719,153 | 1/1988 | Akasawa et al. | 428/517 |

FOREIGN PATENT DOCUMENTS 990228 6/1976 Canada .

*Primary Examiner*—Wilbur Bascomb
*Attorney, Agent, or Firm*—John J. Toney; William D. Lee, Jr.; Mark B. Quatt

[57] ABSTRACT

A multi-layer highly moisture and gas permeable packaging film comprising a core layer of a butadiene-styrene copolymer with a styrene content of 60 to 80% by weight and at least two outer layers having heat sealable and gas permeability properties.

5 Claims, No Drawings

MULTI-LAYER HIGHLY MOISTURE AND GAS PERMEABLE PACKAGING FILM

This invention relates to a highly water and gas permeable packaging multi-layer film, in particular a film for cheese packaging.

In the manufacturing of some types of cheeses, in particular molded rind soft cheeses, like for example Camembert, the cheese has to undergo curing and surface moulds growth finishing processes, which are rather lengthy processes. Therefore such finishing processes are left to go to completion after the manufacturing and packaging of the cheese during its storage period before marketing.

During curing and surface mould growth the cheese absorbs oxygen from the environment and develops moisture and gases, in particular carbon dioxide. The material in which the cheese is packed has to possess therefore a certain permeability to such moisture and gases in order to permit a controlled absorption and removal thereof whereby a desirable finishing process of the cheese can take place.

The packaging materials used up to now for complying with the above mentioned requirements were mostly nontransparent laminates of oiled paper with various additional layers like, paper, aluminium paper, polypropylene, cellophane, etc. Their requested permeability was provided for by the fact that such packing materials were just loosely folded around the cheese by so permitting the moisture and gases to escape through the free spaces between the folds. Alternatively the prior art conventional packing materials were provided with small holes so creating a porosity allowing the package to "breathe".

Such prior art packaging laminates had drawbacks either because they did not guarantee a controlled moisture and gas exchange, or because due to their mostly non-transparent character they were subject to package tampering by users trying to check their contents, and this particularly in supermarkets.

It is an object of the present invention to provide a new type highly permeable packaging film particularly suitable for packaging moulded rind cheese.

It is a further object of this invention to provide a packaging film of the type mentioned above which enables an improved curing and mould growth finishing process for the cheese resulting in an extended shelf life of the same.

Still a further object of this invention is to provide a highly permeable packaging film, particularly for moulded rind cheese, which is transparent and heat sealable and therefore tamperproof.

It has been found that the above mentioned objects are achieved by a multi-layer highly permeable packaging film characterized in that it comprises at least one highly moisture and gas permeable core layer of a butadiene-styrene copolymer with a styrene content of from 60% to 80% by weight of the copolymer, and at least two outer layers having heat sealable and gas permeability properties.

The butadiene-styrene (BDS) copolymer core layer of the laminate film according to this invention confers to it high water vapour permeability values ranging advantageously from 100 to 400 g/m2.day, as measured by the ASTM E-96-66 or F-372-73 methods. Permeability values substantially higher than the above indicated higher limit are disadvantageous in that they can result in a too much dried cheese of poor quality. On the other hand, permeability values below the indicated lower limit are disadvantageous in that they can result in undesired bacteria and yeasts growth on the cheese surface.

Moreover the BDS core layer gives a high stiffness to the packaging film as required in order to guarantee machinability and sufficient resistance of the package during manipulation and transportation.

For illustrative purposes, a BDS copolymer could be used which is available from Phillips Petroleum Co. (USA) as KR-O5 Resin, having a melt flow index (MFI) of 0.5 to 10.

Preferably the thickness of the BDS core layer in the laminate according to this invention ranges from 5 to 30 micrometers.

The outer or "skin" layers of the laminate of this invention has the main function of enabling the laminate to be sealed, while not subtracting from the permeability of the whole laminate. Accordingly also such skin layers have to be made of a material having a certain gas permeability. Accordingly, while polyethylene or polypropylene does not comply with this permeability requirement, the outer layers can be selected from high permeability and sealable polyolefins like polybutylene and higher polyolefins. However preferred outer sealing layers are ethylene-vinylacetate (EVA) copolymers with a vinylacetate content of 8 to 28% by weight of the EVA and a MFI of 0.5 to 7, and the ethylene copolymers known as Very Low Density Linear Polyethylenes (VLDPE) as described in Plastics Technology, September 1984, page 113 and October 1984, page 13 as well as in a company brochure published in February 1984 by DSM in the Netherlands entitled "Stamilex PE". About 10 to 20% by weight of such VLDPE comprises an olefin comonomer, preferably chosen from C4—, C6— and CB-alpha-n-olefins which have a MFI of 0.5 to 8.0.

In addition to the above cited preferred outer layers, these can be also selected from polybutylene and copolymers thereof, poly-4-methyl-pentene-1, polyethylene terephthalate glycol (PETG), polyether polyurethans and elastomeric copolyesters such as ECDEL 9967 sold by Eastman Kodak Co.

Among the above mentioned sealing layers, those indicated as preferred ones also contribute to, or at least do not impair, the high water vapour and gas permeability of the core layer, while also providing, especially in the case of VLDPE, a desirable abuse resistance (resistance to puncture, tear, etc.) property.

The laminate according to the invention can comprise more than the said three critical layers. For example it can comprise up to five layers, i.e. it can comprise one or two further intermediate layers which can be made of the same copolymers forming the skin or outer layers, or alternatively of other still moisture permeable polymers like adhesive resins, for example the modified EVA resin sold by DuPont under the trade name Bynel, or ionomeric resins such as the modified ethylene-methacrylic acid sold by DuPont under the trade name Surlyn.

Usually the laminates according to this invention are prepared with a total thickness ranging from 10 to 50 micrometers.

The laminate structure of the present invention can be manufactured by hot blown coextrusion process from a multilayer circular die, or by water quenching coextrusion and orientation which can possibly also render the laminate heat-shrinkable for particular uses thereof requiring such property. The skin layers may be added with a masterbatch containing antiblock and slip agents, or other conventional manufacturing or handling aids.

The laminate structure according to this invention is used by wrapping it around the food article, in particular a moulded rind cheese and by closing the package by sealing the laminate film. This latter can be trim, heat or bunch sealed. The stiffness of the film conferred to it by the BDS core layer enables its use on automatic packaging machines.

The following tables summarize some illustrative, but not at all limitative, embodiments of the laminate film of this invention and and report the respective moisture vapor transmission (MVT) properties and the oxygen and carbon dioxide properties thereof. The MVT or has been measured according to the ASTM methods E-96-66 or F-372-73, while the 02 and C02 permeabilities have been measured according to ASTM D-3985-81 and D-143-75, respectively.

TABLE I

| Laminate film | MVT ($g/m^2$.day at 38° C. and 100% RH) |
|---|---|
| 1. EVA 14% VA/ BDS /EVA 14% VA<br>  MFI 5      MFI 6   MFI 5<br>  5 u        20 u      5 u | 170 |
| 2. VLDPE 20% Octene/ BDS /VLDPE 20% Octene<br>  MFI 6          MFI 6    MFI 6<br>  5 u            20 u     5 u | 105 |
| 3. EVA 14% VA / Bynel CXA-E-162* / BDS /Bynel CXA-E-162*/EVA 14% VA<br>  MFI 5      MFI 0.8        MFI 6   MFI 0.8              MFI 5<br>  3 u        3 u            20 u    3 u                  3 u | 120 |
| 4. VLDPE 20% Octene /EVA 28% VA / BDS / EVA 28% VA /VLDPE 20% Octene<br>  MFI 6              MFI 7       MFI 6  MFI 7       MFI 7<br>  3 u                3 u          20 u   3 u          3 u | 150 |

*Trade mark of a modified EVA adhesive coploymer sold by DuPont

TABLE II

| EVALUATIONS | EVA/BDS/EVA (*) |
|---|---|
| MVT<br>at 38° C., 100% RH<br>($g/m^2$, 24 hrs) | 170 |
| O2 PERMEABILITY<br>at 23° C., 0% RH<br>(cc/24 hrs, $m^2$, bar) | 3,800 |
| CO2 PERMEABILITY<br>at 23° C., 0% RH<br>(g/24 hrs, $m^2$, bar) | 21,000 |
| MODULUS, $kg/cm^2$<br>(ASTM D-882-75) | 9,000 |

(*) The film is that under point 1 of Table I.

From the above description and examples of the laminate film of this invention it appears that it is a novel type packaging film combining transparency, sealability properties, high moisture and gas permeability properties and high stiffness characteristics. The permeability shown even in a sealed condition guarantees a tamper-proof food packaging which is a very desirable characteristic from a hygienic point of view. The intrinsic permeability of a controlled magnitude ensured by the nature of the materials comprised in the laminate according to this invention enables an improved curing and proper surface moulds growth, resulting in extended shelf life of a respective food package.

What is claimed is:

1. A multilayer high permeability packaging film comprising:
   (a) two layers comprising a polymeric resin selected from the group consisting of
      (i) very low density polyethylene with a comonomer content of from 10% to 22% by weight of the very low density polyethylene, said comonomer selected from the group consisting of $C_4$—, $C_6$— and $C_8$-alpha-n-olefins,
      (ii) polybutylene and copolymers thereof,
      (iii) poly-4-methyl-pentene-1,
      (iv) polyethylene terephthalate glycol,
      (v) polyether,
      (vi) polyurethanes, and
      (vii) elastomeric copolyesters; and
   (b) a third layer disposed between the two layers and comprising butadiene-styrene copolymer with a styrene content of from 60% to 80% by weight of the copolymer.

2. A multilayer high permeability packaging film comprising
   (a) two layers comprising a polymeric resin selected from the group consisting of
      (i) very low density polyethylene with a comonomer content of from 10% to 22% by weight of the very low density polyethylene, said comonomer selected from the group consisting of $C_4$—, $C_6$— and $C_8$-alpha-n-olefins,
      (ii) polybutylene and copolymers thereof,
      (iii) poly-4-methyl-pentene-1,
      (iv) polyethylene terephthalate glycol,
      (v) polyether,
      (vi) polyurethanes,
      (vii) elastomeric copolyesters, and
      (viii) ethylene vinyl acetate copolymer;
   (b) a third layer disposed between the two layers and comprising butadiene-styrene copolymer with a styrene content of from 60% to 80% by weight of the copolymer; and
   (c) an additional layer between the third layer and at least one of the two layers, the additional layer comprising a polymeric material selected from the group consisting of
      (i) ethylene vinyl acetate copolymer with a vinyl acetate content of 8 to 28% by weight,
      (ii) very low density polyethylene containing a comonomer selected from the group consisting of $C_4$—, $C_6$— and $C_8$-alpha-n-olefins in an amount of 10% to 20% by weight of the very low density polyethylene,
      (iii) polybutylene and its copolymers,
      (iv) poly-4-methyl-pentene-1,
      (v) polyethylene terephthalate glycol,
      (vi) polyether,
      (vii) polyurethane,
      (viii) elastomeric copolyesters, (ix) adhesive modified ethylene vinyl acetate copolymer resins, and
(x) ionomeric resins.

3. A multilayer high permeability packaging film according to claims 1 or 2, having a moisture permeability value ranging from 100 to 400 g/m² day.

4. A highly moisture and gas permeable food package comprising a packaging film according to claims 1 or 2 wrapped around a food article and closed by sealing.

5. A package suitable for packaging molded rind cheese comprising a packaging film according to claims 1 or 2 wrapped around the cheese and closed by sealing.

* * * * *